US011972734B1

(12) United States Patent
Cui

(10) Patent No.: US 11,972,734 B1
(45) Date of Patent: Apr. 30, 2024

(54) PIXEL DRIVING CIRCUIT AND DISPLAY PANEL

(71) Applicant: Guangzhou China Star Optoelectronics Semiconductor Display Technology Co., Ltd., Guangzhou (CN)

(72) Inventor: Zhengbo Cui, Guangzhou (CN)

(73) Assignee: Guangzhou China Star Optoelectronics Semiconductor Display Technology Co., Ltd., Guangzhou (CN)

( * ) Notice: Subject to any disclaimer, the term of this patent is extended or adjusted under 35 U.S.C. 154(b) by 0 days.

(21) Appl. No.: 18/192,677

(22) Filed: Mar. 30, 2023

(30) Foreign Application Priority Data

Jan. 31, 2023 (CN) ......................... 202310064873.8

(51) Int. Cl.
*G09G 3/3258* (2016.01)
*G09G 3/3233* (2016.01)

(52) U.S. Cl.
CPC ......... *G09G 3/3258* (2013.01); *G09G 3/3233* (2013.01); *G09G 2300/0426* (2013.01); *G09G 2300/0819* (2013.01); *G09G 2310/0202* (2013.01); *G09G 2310/08* (2013.01); *G09G 2330/021* (2013.01); *G09G 2330/028* (2013.01)

(58) Field of Classification Search
CPC ............... G09G 3/3258; G09G 3/3233; G09G 2300/0426; G09G 2300/0819; G09G 2310/0202; G09G 2310/08; G09G 2330/021; G09G 2330/028
See application file for complete search history.

(56) References Cited

U.S. PATENT DOCUMENTS

2010/0085282 A1* 4/2010 Yu ........................ G09G 3/3233 345/76
2013/0050292 A1* 2/2013 Mizukoshi ........... G09G 3/3233 345/77
2017/0162119 A1* 6/2017 Kim ..................... G09G 3/3258

* cited by examiner

*Primary Examiner* — Dmitriy Bolotin
(74) *Attorney, Agent, or Firm* — Menachem Nathan; Nathan & Associates

(57) ABSTRACT

The present application provides a pixel driving circuit and a display panel. The pixel driving circuit includes a light emitting device, a voltage conversion module electrically connected to the light emitting device via a first node, a driving module electrically connected to the light emitting device via a second node, a data writing module electrically connected to the driving module via a fourth node, a first potential coupling module electrically connected to the second node and the third node, a second potential coupling module, and a first voltage terminal. Before the driving module controls a moment when the light emitting device starts to emit light, the voltage conversion module controls the potential of the first node to change from a first voltage to a second voltage, first potential coupling module couples potential of the third node, and second potential coupling module couples potential of the fourth node.

20 Claims, 5 Drawing Sheets

PIXEL DRIVING CIRCUIT AND DISPLAY PANEL

CROSS-REFERENCE TO RELATED APPLICATION

This application claims priority to and the benefit of Chinese Patent Application No. 202310064873.8, filed on Jan. 31, 2023, the entire content of which is hereby incorporated by reference.

TECHNICAL FIELD

The present application relates to the field of display technologies, and more particularly to a pixel driving circuit and a display panel.

BACKGROUND

In a conventional display device using a sub-millimeter Light Emitting Diode (mini LED), a passive driving mode is used. The display of the display device is implemented with visual delay of human eyes in combination with pulse width modulation and scanning. However, when a low grayscale picture is displayed, various problems such as flickering of the picture and failure of various scanning lines may occur due to reduction in a refresh rate. Alternatively, the display device is driven with an active driving mode in combination with a pulse amplitude modulation mode. Although the normal display of the display device can be ensured within the effective time of each frame without the problem of flickering of the low grayscale picture, it is generally necessary to improve the display effect in a compensation manner due to the poor consistency and stability of transistors of the display device. Currently, external compensation schemes require the addition of specialized external circuits and chips, which can increase costs and do not perform real-time compensation. However, circuit arrangement of internal compensation schemes is in-plane, which can reduce the cost and perform real-time compensation, so it is an ideal compensation method. However, the conventional 4T2C internal compensation scheme also has a disadvantage in that, in order to implement internal compensation, it is necessary to increase a voltage of a negative terminal of a light emitting diode so as to prevent its possible influence on a detection result, which may increase power consumption of the design.

SUMMARY

Embodiments of the present application provide a pixel driving circuit and a display panel, so that power consumption of the panel can be reduced.

An embodiment of the present application provides a pixel driving circuit, including: a light emitting device, a driving module, a data writing module, a voltage conversion module, a first potential coupling module, and a second potential coupling module.

The light emitting device is connected between a first node and a second node. The driving module is electrically connected to the light emitting device via the second node and electrically connected to a first voltage terminal via a third node, and is configured to generate a driving current according to a data signal to control the light emitting device to emit light. The data writing module is electrically connected to the driving module via a fourth node and is configured to output the data signal to the driving module. The voltage conversion module is electrically connected to the first node and is configured to control the potential of the first node to change from a first voltage to a second voltage at a first moment. The first potential coupling module is electrically connected to the second node and the third node, and is configured to couple the potential of the third node when the potential of the first node changes from the first voltage to the second voltage. The second potential coupling module is electrically connected to the second node and the fourth node, and is configured to couple the potential of the fourth node when the potential of the first node changes from the first voltage to the second voltage. The driving module controls the light emitting device to start emitting light at a second moment later than the first moment, and the first voltage is greater than the second voltage.

Alternatively, in some embodiments of the present application, the voltage conversion module includes a control circuit, a voltage generation circuit, and a voltage switching circuit. The control circuit is configured to generate a first control signal and a second control signal. The voltage generation circuit is electrically connected to the control circuit and configured to generate the first voltage and the second voltage. The voltage switching circuit is electrically connected to the first node, the voltage generation circuit, and the control circuit, and is configured to output the first voltage to the first node according to the first control signal, and output the second voltage to the first node according to the second control signal.

Alternatively, in some embodiments of the present application, the control circuit is further configured to generate a third voltage. The voltage generation circuit includes: a direct current converter electrically connected to the control circuit and configured to generate the first voltage according to the third voltage; and a ground circuit configured to provide the second voltage.

Alternatively, in some embodiments of the present application, the voltage switching circuit includes a first switching transistor and a second switching transistor. A gate of the first switching transistor is electrically connected to the control circuit, and a source and a drain of the first switching transistor are electrically connected between the direct current converter and the first node. A gate of the second switching transistor is electrically connected to the control circuit, and a source and a drain of the second switching transistor are electrically connected between the ground circuit and the first node.

Alternatively, in some embodiments of the present application, the first potential coupling module includes a first capacitor and the second potential coupling module includes a second capacitor. The first capacitor is connected between the second node and the third node, and the second capacitor is connected between the second node and the fourth node.

Alternatively, in some embodiments of the present application, the driving module includes a driving transistor, where a gate of the driving transistor is electrically connected to the fourth node, and a source and a drain of the driving transistor are electrically connected between the second node and the third node. The data writing module includes a data transistor, where a gate of the data transistor is configured to receive a first scanning signal, one of a source and a drain of the data transistor is configured to receive the data signal, and another one of the source and the drain of the data transistor is electrically connected to the fourth node. The pixel driving circuit further includes a reset module and a light-emitting control module. The reset module includes a reset transistor, where a gate of the reset transistor is configured to receive a second scanning signal, one of a source and a drain of the reset transistor is configured to receive a reset signal, and another one of the source and the drain of the reset transistor is electrically connected to the second node. The light-emitting control module includes a light-emitting control transistor, where a gate of the light-emitting control transistor is electrically connected to a light-emitting control line, and a source and a drain of the light-emitting control transistor are electrically connected between the driving transistor and the third node.

The present application further provides a display panel, including a plurality of sub-pixels arranged in an array and a voltage conversion module. Each of the sub-pixels includes a light emitting device and a pixel driving circuit. The pixel driving circuit includes a driving transistor, a data transistor, a first capacitor, and a second capacitor. An anode of the light emitting device is electrically connected to one of a source and a drain of the driving transistor, a cathode of the light emitting device is electrically connected to a common node, another one of the source and the drain of the driving transistor is electrically connected to a first voltage terminal, a source and a drain of the data transistor are electrically connected between corresponding one of data lines and a gate of the driving transistor, the first capacitor is connected between the first voltage terminal and the anode of the light emitting device, and the second capacitor is connected between the gate of the driving transistor and the anode of the light emitting device. The voltage conversion module includes a plurality of voltage switching circuits, where each of the voltage switching circuits is electrically connected to light emitting devices of a plurality of sub-pixels in the same row via the common node, and each of the voltage switching circuits is configured to output a first voltage or a second voltage to the common node. The voltage conversion module is configured to control the potential of the common node to change from the first voltage to the second voltage less than the first voltage before the driving transistor drives the light emitting device to emit light.

Alternatively, in some embodiments of the present application, the voltage conversion module includes a control circuit and a voltage generation circuit. The control circuit is further configured to generate a third voltage. The voltage generation circuit includes: a direct current converter electrically connected to the control circuit and configured to generate the first voltage according to the third voltage and output the first voltage to the voltage switching circuit; and a ground circuit configured to provide the second voltage to the voltage switching circuit.

Alternatively, in some embodiments of the present application, the control circuit is further configured to generate a plurality of first control signals and a plurality of second control signals. Each of the voltage switching circuits includes a first switching transistor and a second switching transistor. A gate of the first switching transistor is electrically connected to the control circuit, a source and a drain of the first switching transistor are electrically connected between the direct current converter and a common node corresponding to the voltage switching circuit, and the first switching transistor is configured to output the first voltage to the common node according to corresponding one of the first control signals. A gate of the second switching transistor is electrically connected to the control circuit, a source and a drain of the second switching transistor are electrically connected between the ground circuit and the common node corresponding to the voltage switching circuit, and the second switching transistor is configured to output the second voltage to the common node according to corresponding one of the second control signals.

Alternatively, in some embodiments of the present application, the display panel includes a plurality of first scanning lines, a plurality of second scanning lines, and a plurality of light-emitting control lines. A gate of the data transistor of each of the pixel driving circuits is electrically connected with corresponding one of the first scanning lines. Each of the pixel driving circuits further includes a reset transistor and a light-emitting control transistor. A gate of the reset transistor is electrically connected to corresponding one of the second scanning lines, one of a source and a drain of the reset transistor is electrically connected to a reset line, and another one of the source and the drain of the reset transistor is electrically connected to the light emitting device and the driving transistor. A gate of the light-emitting control transistor is electrically connected to corresponding one of the light-emitting control lines, and a source and a drain of the light-emitting control transistor are electrically connected between the driving transistor and the first voltage terminal.

Embodiments of the present application provide the pixel driving circuit and the display panel. The pixel driving circuit includes the light emitting device, the driving module, the data writing module, the voltage conversion module, the first potential coupling module and the second potential coupling module, where the light emitting device is electrically connected to the voltage conversion module via the first node and is electrically connected to the driving module via the second node, the first voltage terminal is electrically connected to the driving module via the third node, the data writing module is electrically connected to the driving module via the fourth node, the first potential coupling module is electrically connected to the second node and the third node, and the second potential coupling module is electrically connected to the second node and the fourth node. Before the driving module controls the moment when the light emitting device starts to emit light, the voltage conversion module controls the potential of the first node to change from the first voltage to the second voltage lower than the first voltage, the first potential coupling module couples the third node, and the second potential coupling module couples the potential of the fourth node, so that normal light emission of the light emitting device can be realized without setting the voltage of the first voltage terminal very high, thereby reducing power consumption and enlarging the compensation range of the internal compensation circuit. The display panel includes a plurality of array-arranged sub-pixels, each including a light emitting device and a pixel driving circuit, and a voltage conversion module. The display panel includes the plurality of sub-pixels arranged in the array and the voltage conversion module, where each of the sub-pixels includes the light emitting device and the pixel driving circuit.

BRIEF DESCRIPTION OF THE DRAWINGS

In order to more clearly illustrate the technical solutions in embodiments of the present application, the accompanying drawings depicted in the description of the embodiments will be briefly described below. It will be apparent that the accompanying drawings in the following description are merely some embodiments of the present application, and other drawings may be obtained from these drawings without creative effort by those skilled in the art.

EMBODIMENTS OF THE PRESENT DISCLOSURE

Figure 1A:
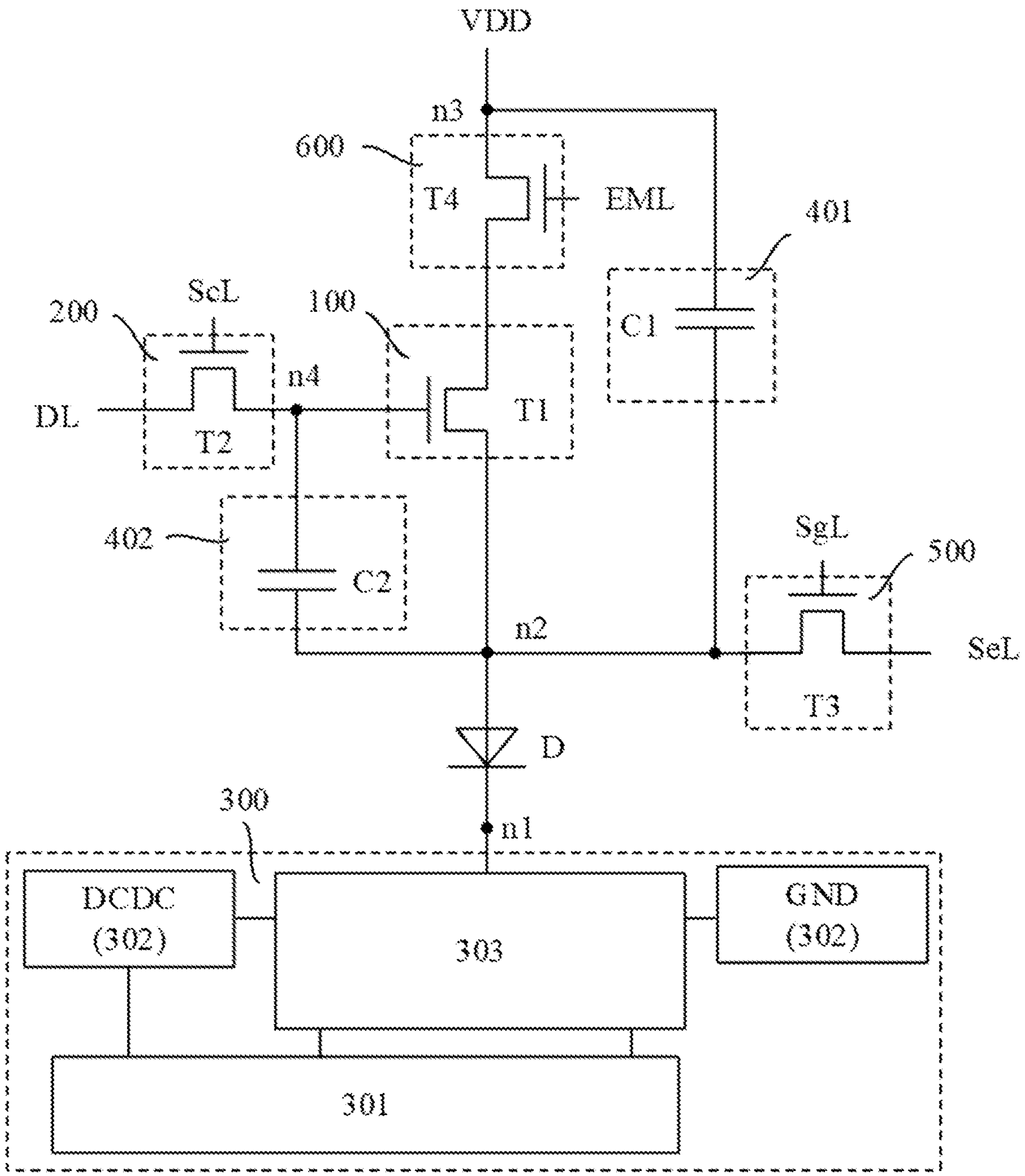
FIGS. 1A-1B show a schematic structural diagram of a pixel driving circuit according to an embodiment of the present application.

Technical solutions in embodiments of the present application will be clearly and completely described below in conjunction with drawings in the embodiments of the present application. Obviously, the described embodiments are only a part of embodiments of the present application, rather than all the embodiments. Any ordinarily skilled person in the technical field of the present application could still obtain other accompanying drawings without use laborious invention based on the present accompanying drawings. In addition, it should be understood that the specific implementations described here are only used to illustrate and explain the present application, and are not used to limit the present application. In the present application, unless otherwise stated, directional words used such as "upper" and "lower" generally refer to the upper and lower directions of the device in actual use or working state, and specifically refer to the drawing directions in the drawings; and "inner" and "outer" refer to the outline of the device.

Figure 1B:
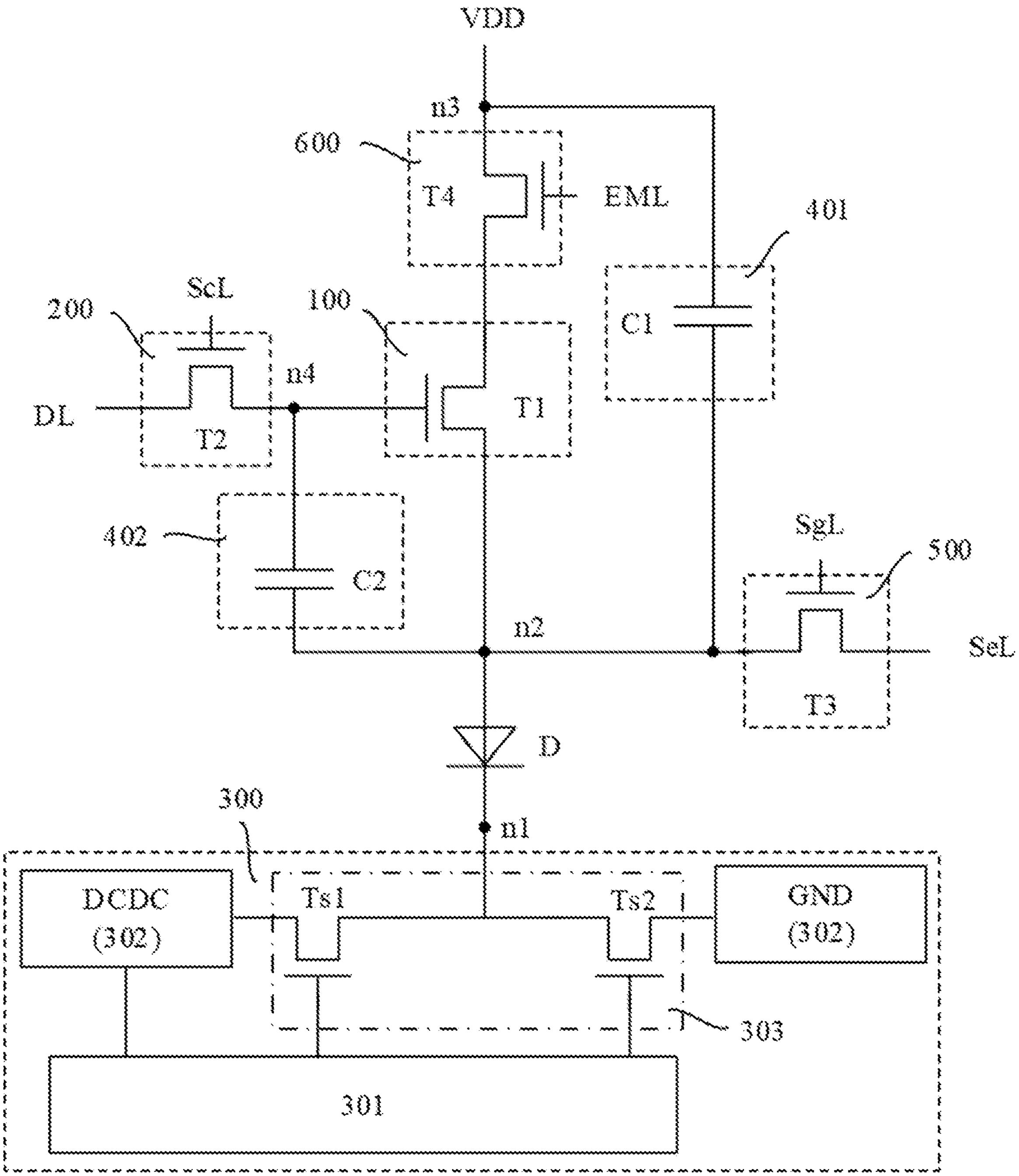

Specifically, FIGS. 1A-1B show a schematic structural diagram of a pixel driving circuit according to an embodiment of the present application. The embodiment of the present application provides a pixel driving circuit, including: a light emitting device D, a driving module 100, a data writing module 200, a voltage conversion module 300, a first potential coupling module 401, and a second potential coupling module 402.

The light emitting device D is connected between a first node n1 and a second node n2. Alternatively, the light emitting device D includes an organic light emitting diode, a sub-millimeter light emitting diode, a micro light emitting diode, and the like.

The driving module 100 is electrically connected to the light emitting device D via the second node n2 and electrically connected to a first voltage terminal VDD via a third node n3, and is configured to generate a driving current according to a data signal Data to control the light emitting device D to emit light.

Alternatively, the driving module 100 includes a driving transistor T1, where a gate of the driving transistor T1 is electrically connected to the fourth node n4, and a source and a drain of the driving transistor T1 are electrically connected between the second node n2 and the third node n3.

The data writing module 200 is electrically connected to the driving module 100 via a fourth node n4 and is configured to output the data signal Data to the driving module 100.

Alternatively, the data writing module 200 includes a data transistor T2, where a gate of the data transistor T2 is electrically connected to a first scanning line ScL to be configured to receive a first scanning signal Scan transmitted by the first scanning line ScL, one of a source and a drain of the data transistor T2 is electrically connected to a data line DL to be configured to receive the data signal Data, and another one of the source and the drain of the data transistor T2 is electrically connected to the fourth node n4.

The voltage conversion module 300 is electrically connected to the first node n1 and configured to control the potential of the first node n1 to change from a first voltage to a second voltage at a first moment t1, the first voltage being greater than the second voltage, so that the potential of the third node n3 and the potential of the fourth node n4 are correspondingly changed through coupling of the first potential coupling module 401 and the second potential coupling module 402, respectively, so that normal light emission of the light emitting device D can be realized without setting the voltage of the first voltage terminal VDD very high, thereby reducing power consumption and enlarging the compensation range of the internal compensation circuit.

Alternatively, the driving module 100 controls the light emitting device D to start emitting light at a second moment t2 later than the first moment t1, so as to avoid affecting a light emitting state of the light emitting device D when the potential of the first node n1 changes from the first voltage to the second voltage.

Alternatively, the first moment t1 is the same as the moment when writing of the data signal Data at the fourth node n4 is completed or lags behind the moment when writing of the data signal Data at the fourth node n4 is completed, so as to reduce the influence of the potential change of the first node n1 on the process of writing of the data signal Data.

Alternatively, the first voltage and the second voltage are both lower than the voltage of the first voltage terminal VDD so that the light emitting device D can be normally driven to emit light.

Alternatively, a voltage difference between the first voltage and the second voltage is greater than the threshold voltage Vth of the driving transistor T1 so that the potential of the third node n3 and the potential of the fourth node n4 can change with the potential of the first node n1. Alternatively, the voltage difference between the first voltage and the second voltage is greater than or equal to 0.5V and less than or equal to 8V.

Alternatively, since the threshold voltage Vth of the driving transistor T1 may drift in an actual application, the voltage difference between the first voltage and the second voltage may be enabled to be greater than or equal to 2V in order to cover the drift range of the threshold voltage Vth of the driving transistor T1. Alternatively, the voltage difference between the first voltage and the second voltage is equal to 3V, 3.5V, 4V, 4.5V, 5V, 5.5V, 6V, 6.5V, 7V, 7.5V, or 8V.

Alternatively, the voltage conversion module 300 includes a control circuit 301, a voltage generation circuit 302, and a voltage switching circuit 303.

Alternatively, the control circuit 301 is configured to generate a first control signal and a second control signal. Alternatively, the control circuit 301 includes a timing controller, a programmable logic gate array, and the like.

The voltage generation circuit 302 is electrically connected to the control circuit 301, and the voltage generating circuit 302 is configured to generate the first voltage and the second voltage. Alternatively, the control circuit 301 is further configured to generate a third voltage. The voltage generation circuit 302 includes: a direct current converter DCDC electrically connected to the control circuit 301 and configured to generate the first voltage according to the third voltage; and a ground circuit GND configured to provide the second voltage.

It should be understood that the second voltage may also be obtained with the control circuit 301 and the direct current converter DCDC.

The voltage switching circuit 303 is electrically connected to the first node n1, the voltage generation circuit 302, and the control circuit 301, and is configured to output the first voltage to the first node n1 according to the first control signal and output the second voltage to the first node n1 according to the second control signal.

Alternatively, the voltage switching circuit 303 includes a first switching transistor Ts1 and a second switching transistor Ts2. A gate of the first switching transistor Ts1 is electrically connected to the control circuit 301 to be configured to receive the first control signal, and a source and a drain of the first switching transistor Ts1 are electrically connected between the direct current converter DCDC and the first node n1. A gate of the second switching transistor Ts2 is electrically connected to the control circuit 301 to be configured to receive the second control signal, and a source and a drain of the second switching transistor Ts2 are electrically connected between the ground circuit GND and the first node n1.

The first potential coupling module 401 is electrically connected to the second node n2 and the third node n3, and is configured to couple the potential of the third node n3 when the potential of the first node n1 changes from the first voltage to the second voltage.

The second potential coupling module 402 is electrically connected to the second node n2 and the fourth node n4, and is configured to couple the potential of the fourth node n4 when the potential of the first node n1 changes from the first voltage to the second voltage.

Alternatively, the first potential coupling module 401 includes a first capacitor C1 and the second potential coupling module 402 includes a second capacitor C2. The first capacitor C1 is connected between the second node n2 and the third node n3, and is configured to couple the potential of the third node n3 when the potential of the first node n1 changes from the first voltage to the second voltage. The second capacitor C2 is connected between the second node n2 and the fourth node n4, and is configured to couple the potential of the fourth node n4 when the potential of the first node n1 changes from the first voltage to the second voltage.

Alternatively, to reduce influence of voltage division of the first capacitor C1 on the second capacitor C2, the capacitance value of the first capacitor C1 is greater than the capacitance value of the second capacitor C2. Alternatively, the capacitance value of the first capacitor C1 may be equal to 10 times the capacitance value of the second capacitor C2.

Alternatively, the pixel driving circuit further includes a reset module 500 and a light-emitting control module 600.

The reset module 500 is configured to reset the potential of the second node n2. Alternatively, the reset module 500 includes a reset transistor T3, where a gate of the reset transistor T3 is electrically connected to the second scanning line SgL to be configured to receive a second scanning signal Sg, one of a source and a drain of the reset transistor T3 is electrically connected to a reset line SeL to be configured to receive a reset signal, and another one of the source and the drain of the reset transistor T3 is electrically connected to the second node n2.

The light-emitting control module 600 is configured to control a light-emitting moment of the light emitting device D. Alternatively, the light-emitting control module 600 includes a light-emitting control transistor T4, where a gate of the light-emitting control transistor T4 is electrically connected to a light-emitting control line EML to be configured to receive a light-emitting control signal EM, and a source and a drain of the light-emitting control transistor T4 are electrically connected between the driving transistor T1 and the third node n3.

Alternatively, the moment when the potential of the first node n1 changes from the second voltage to the first voltage may be the same as the moment when the gate potential of the driving transistor T1 and the anode potential of the light emitting device D begin to reset, so as to subsequently implement detection of the threshold voltage Vth of the driving transistor T1.

Figure 2:
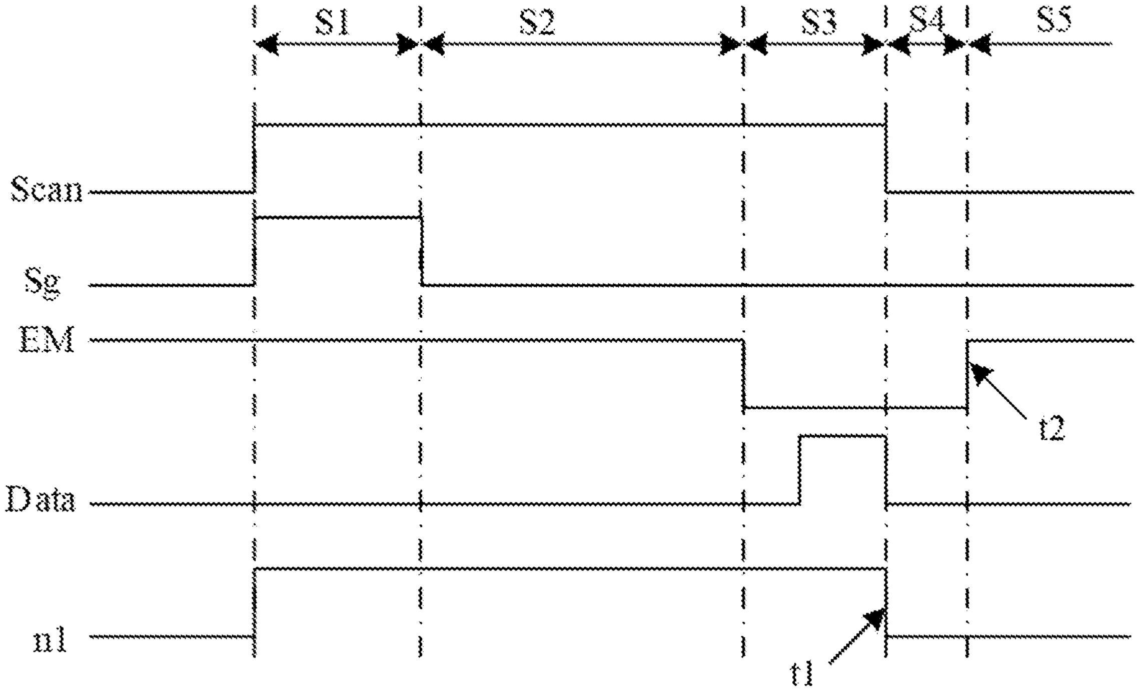
FIG. 2 shows a schematic timing diagram of the pixel driving circuit according the embodiment of the present application.

FIG. 2 shows a schematic timing diagram of the pixel driving circuit according the embodiment of the present application. The operation principle of the pixel driving circuit is illustrated by taking an example that all of the driving transistor T1, the data transistor T2, the reset transistor T3, and the light-emitting control transistor T4 included in the pixel driving circuit are N-type transistors.

The operation process of the pixel driving circuit includes an initialization stage S1, a threshold voltage detection stage S2, a data signal writing stage S3, a potential conversion stage S4, and a light emitting stage S5.

In the initialization phase S1, all of the first scanning signal Scan, the second scanning signal Sg, and the light-emitting control signal EM are at a high level, and the first switching transistor Ts1 transmits a first voltage to the first node n1 so that the potential of the first node n1 holds the first voltage. The data transistor T2 is turned on according to the first scanning signal Scan, and the data signal Data transmitted by the data line DL at this time, i.e., Vref, is transmitted to the fourth node n4 via the data transistor T2 to reset the gate potential of the driving transistor T1. The reset transistor T3 is turned on according to the second scanning signal Sg so that a reset signal Vint transmitted by the reset line SeL is transmitted to the second node n2 to reset the potential of the second node n2.

Alternatively, to enable the driving transistor T1 to be turned on in the initialization phase S1 to ensure accuracy of the threshold voltage Vth of the driving transistor T1 detected in the threshold voltage detection phase S2, let (Vref−Vint)>Vth.

In the threshold voltage detection stage S2, both the first scanning signal Scan and the light-emitting control signal EM are at a high level, the potential of the first node n1 holds the first voltage, and the second scanning signal Sg is at a low level. The data transistor T2 is turned on according to the first scanning signal Scan, and the data signal Data transmitted by the data line DL at this time, i.e., Vref, is transmitted to the fourth node n4. The reset transistor T3 is turned off according to the second scanning signal Sg. The light-emitting control transistor T4 is turned on according to the light-emitting control signal EM to enable the driving transistor T1 to be turned on. The driving transistor T1 is turned off when the potential of the second node n2 changes from Vint to (Vref−Vth), and the second capacitor C2 holds a voltage difference between the second node n2 and the fourth node n4, that is, the second capacitor C2 stores the threshold voltage Vth of the driving transistor T1.

In the data signal writing stage S3, the first scanning signal Scan is at a high level, the potential of the first node n1 holds the first voltage, and both the second scanning signal Sg and the light-emitting control signal EM are at a low level. The data transistor T2 is turned on according to the first scanning signal Scan, and the data signal Data transmitted by the data line DL at this time, i.e., Vdata, is transmitted to the fourth node n4. The reset transistor T3 is turned off according to the second scanning signal Sg, the light-emitting control transistor T4 is turned off according to the light-emitting control signal EM, and the voltage difference between the fourth node n4 and the second node n2 is Vgs=Vdata−(Vref−Vth).

In the potential conversion stage S4, all of the first scanning signal Scan, the second scanning signal Sg, and the light-emitting control signal EM are at a high level, and the second switching transistor Ts2 transmits the second voltage to the first node n1 so that the potential of the first node n1 holds the second voltage. The data transistor T2 is turned off according to the first scanning signal Scan, the reset transistor T3 is turned off according to the second scanning signal Sg, the light-emitting control transistor T4 is turned off according to the light-emitting control signal EM, the potential of the first node n1 changes from the first voltage to the second voltage, so that the potential of the third node n3 is decreased by coupling of the first capacitor C1, and the potential of the fourth node n4 is decreased by coupling of the second capacitor C2. Alternatively, reduced magnitude of the potential of the third node n3 may be the same as that of the potential of the first node n1, that is, the potential of the first node n1 is changed in the same proportion as the potential of the third node n3.

In the light emitting stage S5, the light-emitting control signal EM is at a high level, the first scanning signal Scan and the second scanning signal Sg are both at a low level, and the potential of the first node n1 holds the second voltage to enable the light-emitting control transistor T4 to be turned on so that the potential of the second node n2 and the potential of the fourth node n4 are synchronously raised, which in turn enables the driving current generated by the driving transistor T1 to change from $I=[(Cox\cdot\mu m\cdot W/L)*(Vgs-Vth)^2]/2$ to $I=[(Cox\cdot\mu m\cdot W/L)*(Vdata-Vref)^2]/2$. Therefore, the influence of the threshold voltage Vth of the driving transistor T1 on the driving current can be improved, which can reduce the power consumption. Cox, μm, W, and L represent a channel capacitance per circuit area, a channel mobility, a channel width, and a channel length of the transistor, respectively.

The inventors have verified that, when the voltage conversion module 300 is not used in the pixel driving circuit to control the potential of the first node n1, the voltage of the first voltage terminal VDD needs to be set to 14V, and when the voltage conversion module is used in the pixel driving circuit to control the potential of the first node n1, the voltage of the first voltage terminal VDD is set to 10V, so that the light emitting device D can be driven to realize normal light emission. Therefore, the pixel driving circuit provided in the embodiment of the present application can reduce power consumption.

Figure 3:
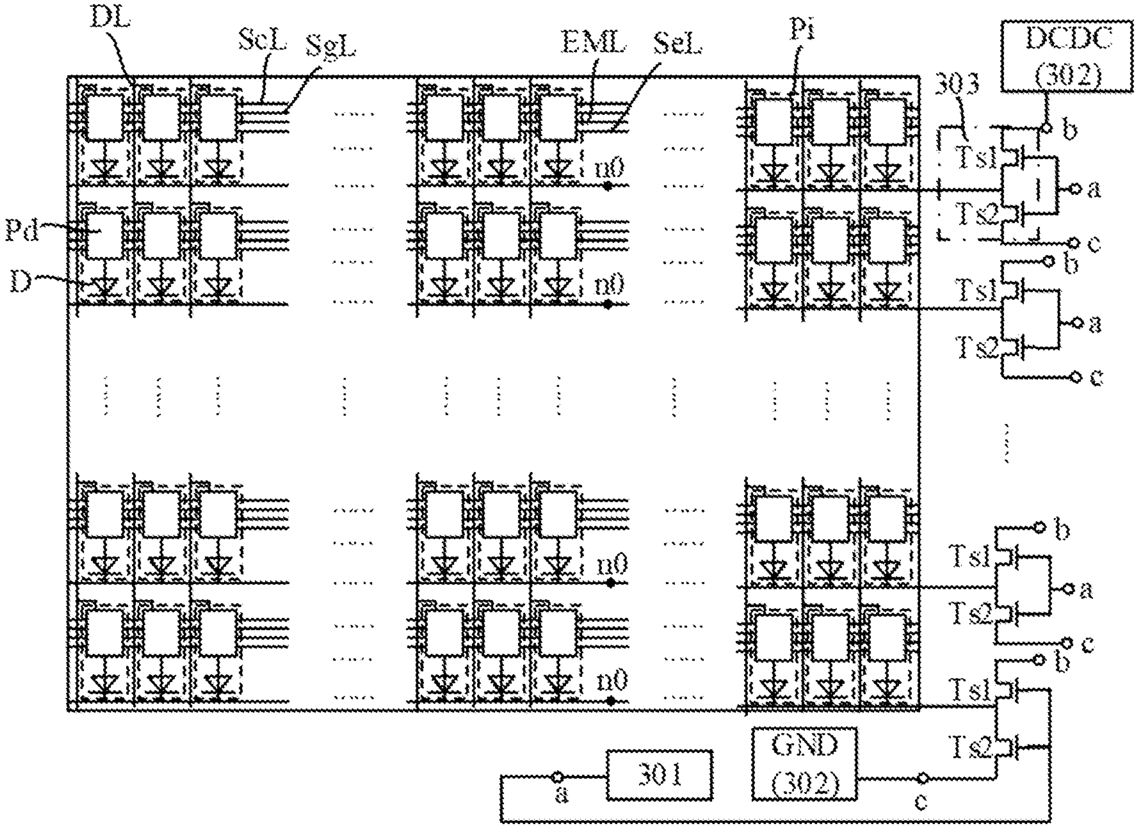
FIG. 3 shows a schematic structural diagram of a display panel according to an embodiment of the present application.
Figure 4:
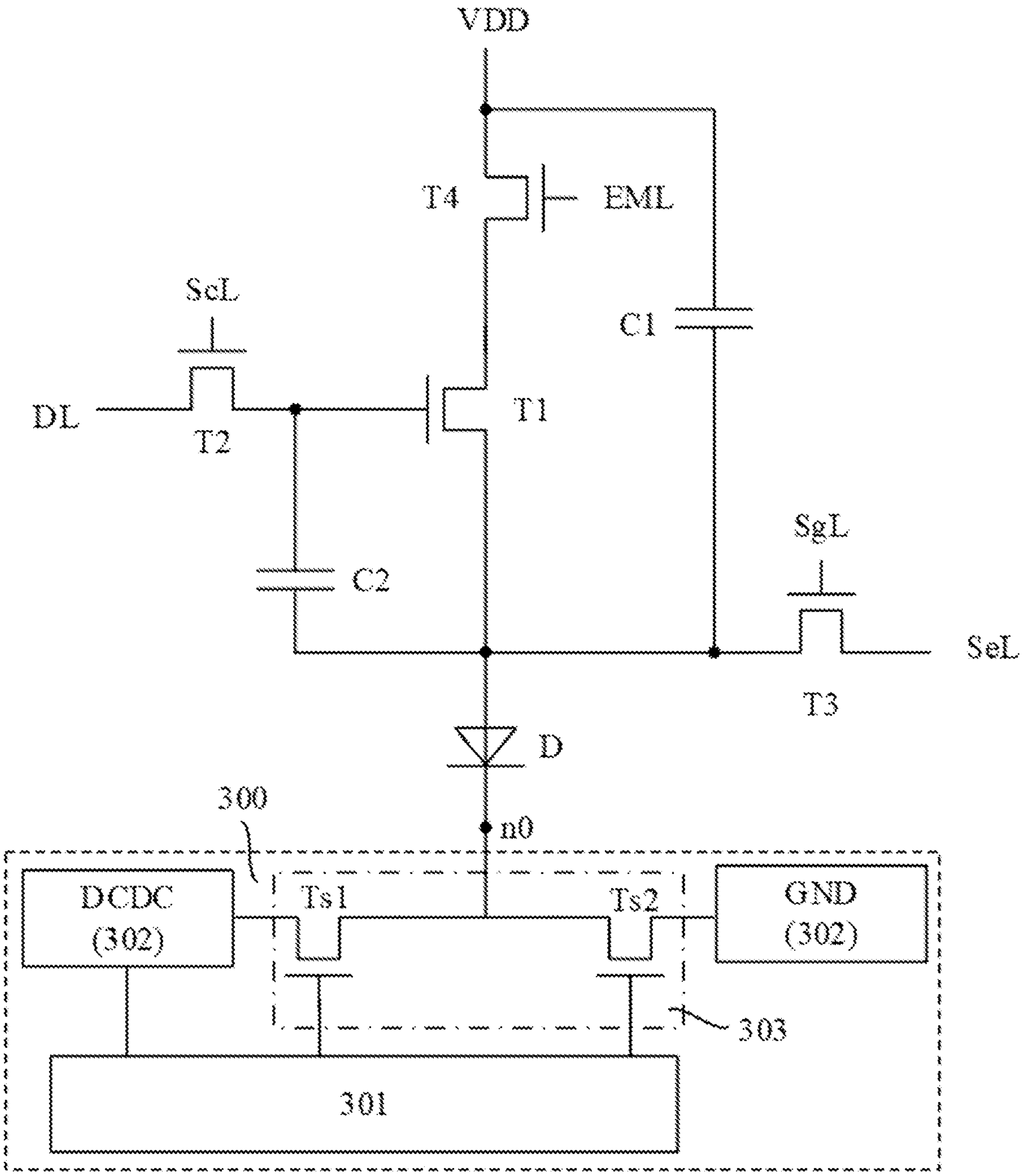
FIG. 4 shows a schematic structural diagram of a pixel driving circuit according to another embodiment of the present application.

FIG. 3 shows a schematic structural diagram of a display panel according to an embodiment of the present application, and FIG. 4 shows a schematic structural diagram of a pixel driving circuit according to another embodiment of the present application. The present application provides a display panel. The display panel includes a plurality of data lines DL, a plurality of first scanning lines ScL, a plurality of second scanning lines SgL, a plurality of light-emitting control lines EML, a plurality of sub-pixels Pi arranged in an array, and a voltage conversion module 300.

Alternatively, the plurality of data lines DL are configured to transmit a plurality of data signals, the plurality of first scanning lines ScL are configured to transmit a plurality of cascaded first scanning signals, the plurality of second scanning lines SgL are configured to transmit a plurality of cascaded second scanning signals, and the plurality of light-emitting control lines EML are configured to transmit a plurality of cascaded light-emitting control signals.

Each of the plurality of sub-pixels Pi is electrically connected to corresponding one of the data lines DL, corresponding one of the first scanning lines ScL, corresponding one of the second scanning lines SgL, and corresponding one of the light-emitting control lines EML so that the sub-pixel Pi is displayed according to the first scanning signal, the second scanning signal, and the light-emitting control signal.

Alternatively, each of the sub-pixels Pi includes a light emitting device D and a pixel driving circuit Pd.

Alternatively, the light emitting device D includes an organic light emitting diode, a sub-millimeter light emitting diode, a micro light emitting diode, and the like.

The pixel driving circuit Pd includes a driving transistor T1, a data transistor T2, a first capacitor C1, and a second capacitor C2.

An anode of the light emitting device D is electrically connected to one of a source and a drain of the driving transistor T1, a cathode of the light emitting device D is electrically connected to a common node n0, another one of the source and the drain of the driving transistor T1 is electrically connected to a first voltage terminal VDD, a source and a drain of the data transistor T2 are electrically connected between corresponding one of the data lines DL and a gate of the driving transistor T1, the first capacitor C1 is connected between the first voltage terminal VDD and the anode of the light emitting device D, and the second capacitor C2 is connected between the gate of the driving transistor T1 and the anode of the light emitting device D.

The voltage conversion module 300 includes a plurality of voltage switching circuits 303, where each of the voltage switching circuits 303 is electrically connected to light emitting devices D of the plurality of sub-pixels in the same row via the common node n0, and each of the voltage switching circuits 303 is configured to output a first voltage or a second voltage to the common node n0.

The voltage conversion module 300 is configured to control the potential of the common node n0 to change from the first voltage to the second voltage less than the first voltage before the driving transistor T1 drives the light emitting device D to emit light, so as to couple the change of the potential to the first voltage terminal VDD and the gate of the driving transistor T1 via the first capacitor C1 and the second capacitor C2, so that the voltage of the first voltage terminal VDD does not need to be set very high, so that normal light emission of the light emitting devices of the plurality of sub-pixels in the same row can be realized without setting the voltage of the first voltage terminal very high, thereby reducing power consumption and enlarging the compensation range of the internal compensation circuit. As a result, the product reliability and the product yield are improved, and thus the competitiveness of the glass-based active driving direct-display product is improved. In addition, since the plurality of sub-pixels in the same row multiplexes the same voltage switching circuit 303, manufacturing costs and layout space can also be saved.

Alternatively, the voltage conversion module 300 further includes a control circuit 301 and a voltage generation circuit 302. The control circuit 301 is further configured to generate a third voltage. The voltage generation circuit 302 includes: a direct current converter DCDC electrically connected to the control circuit 301 and configured to generate the first voltage according to the third voltage and output the first voltage to the voltage switching circuit 303; and a ground circuit GND configured to provide the second voltage to the voltage switching circuit 303.

Alternatively, the plurality of voltage switching circuits 303 may be electrically connected to the same control circuit 301 and the same voltage generation circuit 302. As shown in FIG. 3, all the ports a may be electrically connected to the control circuit 301, all the ports b may be electrically connected to the direct current converter DCDC, and all the ports c may be electrically connected to the ground circuit GND to save the manufacturing costs.

Alternatively, the control circuit 301 includes a timing controller, a programmable logic gate array, and the like.

Alternatively, the control circuit 301 is configured to generate a plurality of first control signal and a plurality of second control signal. Each of the voltage switching circuits 303 includes a first switching transistor Ts1 and a second switching transistor Ts2. A gate of the first switching transistor Ts1 is electrically connected to the control circuit 301, a source and a drain of the first switching transistor Ts1 are electrically connected between the direct current converter DCDC and the common node n0 corresponding to the voltage switching circuit 303, and the first switching transistor Ts1 is configured to output the first voltage to the common node n0 according to corresponding one of the first control signals. A gate of the second switching transistor Ts2 is electrically connected to the control circuit 301, a source and a drain of the second switching transistor Ts2 are electrically connected between the ground circuit GND and the common node n0 corresponding to the voltage switching circuit 303, and the second switching transistor Ts2 is configured to output the second voltage to the common node n0 according to corresponding one of the second control signals.

Alternatively, a gate of the data transistor T2 of each of the pixel driving circuits Pd is electrically connected with corresponding one of the first scanning lines ScL. Each of the pixel driving circuits further includes a reset transistor T3 and a light-emitting control transistor T4. A gate of the reset transistor T3 is electrically connected to one SgL of the second scanning lines corresponding to the reset transistor T3, one of a source and a drain of the reset transistor T3 is electrically connected to a reset line SeL, and another one of the source and the drain of the reset transistor T3 is electrically connected to the light emitting device D and the driving transistor T1. A gate of the light-emitting control transistor T4 is electrically connected to one of the light-emitting control lines corresponding to the light-emitting control transistor T4, and a source and a drain of the light-emitting control transistor T4 are electrically connected between the driving transistor T1 and the first voltage terminal VDD.

Alternatively, since the plurality of sub-pixels are displayed in a progressive-scan driving mode, the plurality of first control signals and the plurality of second control signals may be set in the form of cascaded signals, respectively, to control the light-emitting state of the corresponding row of sub-pixels in accordance with the cascaded first scanning signals, the cascaded second scanning signals, and the cascaded light-emitting control signals.

It should be understood that the operation principle of the pixel driving circuit Pd can be obtained with reference to the timing of FIG. 2, and details thereof are not repeatedly described herein.

The present application further provides a display device including the pixel driving circuit according to any one of the foregoing embodiments or the display panel according to any one of the foregoing embodiments.

It should be understood that the display device includes a movable display device (such as a notebook computer, a mobile phone, and the like), a fixed terminal (such as a desktop computer, a television, and the like), a measuring device (such as a sports wristband, a thermometer, and the like), and the like.

A specific example is used herein to describe a principle and an implementation of the present application. The description of the foregoing embodiments is merely used to help understand a method and a core idea of the present application. In addition, a person skilled in the art may make changes in a specific implementation manner and an application scope according to an idea of the present application. In conclusion, content of this specification should not be construed as a limitation on the present application.

What is claimed is:

1. A pixel driving circuit, comprising:

a light emitting device connected between a first node and a second node;

a driving module, electrically connected to the light emitting device via the second node and electrically connected to a first voltage terminal via a third node, that is configured to generate a driving current based on a data signal to control the light emitting device to emit light;

a data writing module, electrically connected to the driving module via a fourth node, that is configured to output the data signal to the driving module;

a voltage conversion module, electrically connected to the first node, that is configured to change a potential of the first node from a first voltage to a second voltage at a first moment;

a first potential coupling module, electrically connected to the second node and the third node, that is configured to couple a potential of the third node when the potential of the first node changes from the first voltage to the second voltage; and a second potential coupling module, electrically connected to the second node and the fourth node, that is configured to couple a potential of the fourth node when the potential of the first node changes from the first voltage to the second voltage;

wherein the driving module controls the light emitting device to start emitting light at a second moment later than the first moment, and the first voltage is greater than the second voltage.

2. The pixel driving circuit of claim 1, wherein the voltage conversion module comprises:

a control circuit configured to generate a first control signal and a second control signal;

a voltage generation circuit, electrically connected to the control circuit, that is configured to generate the first voltage and the second voltage; and a voltage switching circuit, electrically connected to the first node, the voltage generation circuit, and the control circuit, that is configured to output the first voltage to the first node based on the first control signal, and output the second voltage to the first node based on the second control signal.

3. The pixel driving circuit of claim 2, wherein the control circuit is further configured to generate a third voltage;

the voltage generation circuit comprises:

a direct current converter electrically connected to the control circuit and configured to generate the first voltage based on the third voltage; and a ground circuit configured to provide the second voltage.

4. The pixel driving circuit of claim 3, wherein the voltage switching circuit comprises:

a first switching transistor, wherein a gate of the first switching transistor is electrically connected to the control circuit, and a source and a drain of the first switching transistor are electrically connected between the direct current converter and the first node; and a second switching transistor, wherein a gate of the second switching transistor is electrically connected to the control circuit, and a source and a drain of the second switching transistor are electrically connected between the ground circuit and the first node.

5. The pixel driving circuit of claim 1, wherein the first potential coupling module comprises a first capacitor connected between the second node and the third node; and the second potential coupling module comprises a second capacitor connected between the second node and the fourth node.

6. The pixel driving circuit of claim 1, wherein the driving module comprises a driving transistor, wherein a gate of the driving transistor is electrically connected to the fourth node, and a source and a drain of the driving transistor is electrically connected between the second node and the third node; and the data writing module includes a data transistor, wherein a gate of the data transistor is configured to receive a first scanning signal, one of a source and a drain of the data transistor is configured to receive the data signal, and another one of the source and the drain of the data transistor is electrically connected to the fourth node;

the pixel driving circuit further comprises:

a reset module comprising a reset transistor, wherein a gate of the reset transistor is configured to receive a second scanning signal, one of a source and a drain of the reset transistor is configured to receive a reset signal, and another one of the source and the drain of the reset transistor is electrically connected to the second node; and a light-emitting control module comprising a light-emitting control transistor, wherein a gate of the light-emitting control transistor is electrically connected to a light-emitting control line, and a source and a drain of the light-emitting control transistor are electrically connected between the driving transistor and the third node.

7. A display device, comprising the pixel driving circuit of claim 1.

8. The display device of claim 7, wherein the voltage conversion module comprises:

a control circuit configured to generate a first control signal and a second control signal;

a voltage generation circuit, electrically connected to the control circuit, that is configured to generate the first voltage and the second voltage; and a voltage switching circuit, electrically connected to the first node, the voltage generation circuit, and the control circuit, that is configured to output the first voltage to the first node based on the first control signal, and output the second voltage to the first node based on the second control signal.

9. The display device of claim 8, wherein the control circuit is further configured to generate a third voltage;

the voltage generation circuit comprises:

a direct current converter electrically connected to the control circuit and configured to generate the first voltage based on the third voltage; and a ground circuit configured to provide the second voltage.

10. The display device of claim 9, wherein the voltage switching circuit comprises:

a first switching transistor, wherein a gate of the first switching transistor is electrically connected to the control circuit, and a source and a drain of the first switching transistor are electrically connected between the direct current converter and the first node; and a second switching transistor, wherein a gate of the second switching transistor is electrically connected to the control circuit, and a source and a drain of the second switching transistor are electrically connected between the ground circuit and the first node.

11. The display device of claim 7, wherein the first potential coupling module comprises a first capacitor connected between the second node and the third node; and the second potential coupling module comprises a second capacitor connected between the second node and the fourth node.

12. The display device of claim 7, wherein the driving module comprises a driving transistor, wherein a gate of the driving transistor is electrically connected to the fourth node, and a source and a drain of the driving transistor is electrically connected between the second node and the third node; and the data writing module includes a data transistor, wherein a gate of the data transistor is configured to receive a first scanning signal, one of a source and a drain of the data transistor is configured to receive the data signal, and another one of the source and the drain of the data transistor is electrically connected to the fourth node;

the pixel driving circuit further comprises:

a reset module comprising a reset transistor, wherein a gate of the reset transistor is configured to receive a second scanning signal, one of a source and a drain of the reset transistor is configured to receive a reset signal, and another one of the source and the drain of the reset transistor is electrically connected to the second node; and a light-emitting control module comprising a light-emitting control transistor, wherein a gate of the light-emitting control transistor is electrically connected to a light-emitting control line, and a source and a drain of the light-emitting control transistor are electrically connected between the driving transistor and the third node.

13. A display panel, comprising:

a plurality of sub-pixels arranged in an array, each of the sub-pixels comprising:

a light emitting device, comprising a cathode electrically connected to a common node, and an anode; and a pixel driving circuit, comprising:

a driving transistor, wherein one of a source and a drain of the driving transistor is connected to an anode of the light emitting device, and another one of the source and the drain of the driving transistor is electrically connected to a first voltage terminal;

a data transistor, comprising a source and a drain, both electrically connected between corresponding one of data lines and a gate of the driving transistor;

a first capacitor, connected between the first voltage terminal and the anode of the light emitting device; and a second capacitor, connected between the gate of the driving transistor and the anode of the light emitting device; and a voltage conversion module comprising a plurality of voltage switching circuits, wherein each of the voltage switching circuits is electrically connected to light emitting devices of a plurality of sub-pixels in the same row via the common node, and each of the voltage switching circuits is configured to output a first voltage or a second voltage to the common node;

wherein the voltage conversion module is configured to control a potential of the common node to change from the first voltage to the second voltage less than the first voltage before the driving transistor drives the light emitting device to emit light.

14. The display panel of claim 13, wherein the voltage conversion module further comprises:

a control circuit configured to generate a third voltage; and a voltage generation circuit comprising:

a direct current converter, electrically connected to the control circuit and configured to generate the first voltage based on the third voltage and output the first voltage to the voltage switching circuit; and a ground circuit, configured to supply the second voltage to the voltage switching circuit.

15. The display panel of claim 14, wherein the control circuit is configured to generate a plurality of first control signal and a plurality of second control signal, and each of the voltage switching circuits comprises:

a first switching transistor, wherein a gate of the first switching transistor is electrically connected to the control circuit, a source and a drain of the first switching transistor are electrically connected between the direct current converter and a common node corresponding to the voltage switching circuit, and the first switching transistor is configured to output the first voltage to the common node based on corresponding one of the first control signals; and a second switching transistor, wherein a gate of the second switching transistor is electrically connected to the control circuit, a source and a drain of the second switching transistor are electrically connected between the ground circuit and the common node corresponding to the voltage switching circuit, and the second switching transistor is configured to output the second voltage to the common node based on corresponding one of the second control signals.

16. The display panel of claim 13, wherein the display panel includes a plurality of first scanning lines, a plurality of second scanning lines, and a plurality of light-emitting control lines, a gate of the data transistor of each of the pixel driving circuits is electrically connected with corresponding one of the first scanning lines, and each of the pixel driving circuits further comprises:

a reset transistor, wherein a gate of the reset transistor is electrically connected to corresponding one of the second scanning lines, one of a source and a drain of the reset transistor is electrically connected to a reset line, and another one of the source and the drain of the reset transistor is electrically connected to the light emitting device and the driving transistor; and a light-emitting control transistor, wherein a gate of the light-emitting control transistor is electrically connected to corresponding one of the light-emitting control lines, and a source and a drain of the light-emitting control transistor are electrically connected between the driving transistor and the first voltage terminal.

17. A display device, comprising the display panel of claim 13.

18. The display device of claim 17, wherein the voltage conversion module further comprises:

a control circuit configured to generate a third voltage; and a voltage generation circuit comprising:

a direct current converter, electrically connected to the control circuit and configured to generate the first voltage based on the third voltage and output the first voltage to the voltage switching circuit; and a ground circuit, configured to supply the second voltage to the voltage switching circuit.

19. The display device of claim 18, wherein the control circuit is configured to generate a plurality of first control signal and a plurality of second control signal, and each of the voltage switching circuits comprises:

a first switching transistor, wherein a gate of the first switching transistor is electrically connected to the control circuit, a source and a drain of the first switching transistor are electrically connected between the direct current converter and a common node corresponding to the voltage switching circuit, and the first switching transistor is configured to output the first voltage to the common node based on corresponding one of the first control signals; and a second switching transistor, wherein a gate of the second switching transistor is electrically connected to the control circuit, a source and a drain of the second switching transistor are electrically connected between the ground circuit and the common node corresponding to the voltage switching circuit, and the second switching transistor is configured to output the second voltage to the common node based on corresponding one of the second control signals.

20. The display device of claim 17, wherein the display panel includes a plurality of first scanning lines, a plurality of second scanning lines, and a plurality of light-emitting control lines, a gate of the data transistor of each of the pixel driving circuits is electrically connected with corresponding one of the first scanning lines, and each of the pixel driving circuits further comprises:

a reset transistor, wherein a gate of the reset transistor is electrically connected to corresponding one of the second scanning lines, one of a source and a drain of the reset transistor is electrically connected to a reset line, and another one of the source and the drain of the reset transistor is electrically connected to the light emitting device and the driving transistor; and a light-emitting control transistor, wherein a gate of the light-emitting control transistor is electrically connected to corresponding one of the light-emitting control lines, and a source and a drain of the light-emitting control transistor are electrically connected between the driving transistor and the first voltage terminal.

* * * * *